United States Patent [19]

McAndrew

[11] Patent Number: 5,089,070
[45] Date of Patent: Feb. 18, 1992

[54] POLY(PROPYLENE CARBONATE)-CONTAINING CERAMIC TAPE FORMULATIONS AND THE GREEN TAPES RESULTING THEREFROM

[76] Inventor: Thomas P. McAndrew, 941 Vine St., Macungie, Pa. 18062

[21] Appl. No.: 447,452

[22] Filed: Dec. 7, 1989

[51] Int. Cl.[5] .............................................. C04B 35/64
[52] U.S. Cl. ...................................... 156/89; 264/63; 264/166; 264/344
[58] Field of Search .................... 264/63, 166, 344; 156/89

[56] References Cited

U.S. PATENT DOCUMENTS

| | | | |
|---|---|---|---|
| 3,585,168 | 6/1971 | Inoue et al. | 264/77.5 D |
| 3,780,150 | 12/1973 | Stetson et al. | 264/63 |
| 3,899,544 | 8/1975 | Kaiser et al. | 264/41 |
| 3,953,383 | 4/1976 | Inoue et al. | 260/2 |
| 4,080,414 | 3/1978 | Anderson et al. | 264/41 |
| 4,104,345 | 8/1978 | Anderson et al. | 264/43 |
| 4,234,367 | 11/1980 | Herron et al. | 156/89 |
| 4,413,061 | 11/1983 | Kumar et al. | 501/7 |
| 4,474,731 | 10/1984 | Brownlow et al. | 419/5 |
| 4,504,339 | 3/1985 | Kamehara et al. | 156/89 |
| 4,540,621 | 9/1985 | Eggerding et al. | 428/209 |
| 4,598,107 | 7/1986 | Herron et al. | 523/351 |
| 4,627,160 | 12/1986 | Herron et al. | 29/830 |
| 4,752,857 | 6/1988 | Khoury et al. | 361/321 |
| 4,766,027 | 8/1988 | Burn | 428/210 |
| 4,814,370 | 3/1989 | Kramer et al. | 524/391 |
| 4,874,030 | 10/1989 | Kuphal et al. | 164/34 |
| 4,882,110 | 11/1989 | Kramer et al. | 264/63 |

FOREIGN PATENT DOCUMENTS 0300039 1/1987 European Pat. Off. .
62-21753 1/1987 Japan .

OTHER PUBLICATIONS

Inoue et al, "Synthesis of Macromolecules from Carbon Dioxide"; *Organic and Bio-Organic Chemistry of Carbon Dioxide*; ch. 4, J. Wiley & Sons, New York (1982).
Hayduk & Adams; "Nitrogen-Nitrous Oxide A Reactive Atmosphere for Copper Thick-Film Processing"; Int'l Society for Hybrid Mfg. Proceedings of 1987, Cong. of ISHM; pp. 569-576.

Primary Examiner—James Derrington

[57] ABSTRACT

Ceramic green tape formulations are described comprising critical amounts of a ceramic powder, poly(propylene carbonate) as the binder, a solvent mixture and a plasticizer. These ingredients are admixed to yield a slurry having a Brookfield viscosity in the range of about 500 to 4500 cps at 25° C. The slurry is cast into a thin film on a substrate, the solvent mixture is removed from the film and the green tape is removed from the substrate. The poly(propylene carbon)-based green tapes have been shown to have tensile strengths of greater than 35 psi and flexibility which would permit successful punching of register and feed-through (via) holes and screen printing. The green tapes of this method are easily laminated to produce multilayered capacitors and other multilayered structures having ceramic contents well in the range generally considered desirable for ceramic processing. The binder burn-off characteristics of the green tapes of this invention are superior to prior art precursor formulations under all comparable conditions.

11 Claims, 3 Drawing Sheets

POLY(PROPYLENE CARBONATE)-CONTAINING CERAMIC TAPE FORMULATIONS AND THE GREEN TAPES RESULTING THEREFROM

TECHNICAL FIELD

This invention relates to ceramic formulations; thin, flat ceramic/polymer composites known as ceramic green tapes used extensively in the fabrication of high-technology ceramic articles such as multilayer substrates for microelectronic packaging and multilayer capacitors; and a method of producing the green tapes. More particularly, the invention relates to combining a ceramic powder, poly(propylene carbonate) as the binder, a plasticizer and a solvent mixture to prepare formulations which yield green tapes having desirable strength and flexibility and from which the binder can be substantially eliminated during burn-out or firing prior to sintering.

BACKGROUND OF THE INVENTION

Green tapes are typically prepared by slip casting a slurry of the ceramic powder onto a nonporous carrier such as a glass or stainless steel plate or a plastic film of polypropylene or Mylar® (glycol terephthalic acid polyester). A doctor blade or knife is passed over the slurry-coated carrier to achieve the desired slip thickness for the green tape. The volatile constituents in the slurry are removed by evaporation or other drying processes. The resulting green tape, if properly formulated, can easily be removed from the carrier. The green tapes which are fabricated into the multilevel structure are finally fired to remove the binder and other residual materials remaining from the drying step and to sinter the ceramic powder into a continuous ceramic dielectric structure.

In the fabrication of such structures, one of the chief problems has been that the prior art binders have not been sufficiently removed during the firing step at temperatures which maintain the ceramic in a porous condition during such a step. These binders have included cellulosic resins such as cellulose nitrates, cellulose esters, alkyl cellulose ethers, hydroxyalkylcellulose ethers, alkyl hydroxyalkylcellulose ethers and dialkylene glycol cellulose ethers and polymers such as polyurethane, polyvinylbutyral, polyvinyl acetate, poly(alphamethylstyrene), poly(methylmethacrylate), polyisobutylene, poly(oxymethylene), polyethylene and polypropylene.

U.S. Pat. No. 3,780,150 (1973) discloses the basic prior art method for making thin alumina ceramics from green tapes in which alumina is milled with an azeotropic solvent mixture of trichloroethylene and alcohol, talc and a wetting agent or surfactant to a desired surface area per gram of dielectric; a slip is formulated of the dielectric mixture with the same solvent mixture, a suitable binder, e.g. polyvinylbutyral, and a mixture of triethylene glycol hexanoate and phthlate esters as the plasticizer; de-airing and casting the slip on a substrate; removing the volatiles; separating the resulting green tape from the substrate; and firing the green tape at about 1425° to 1550° C.

U.S. Pat. No. 3,899,554 (1975) discloses a method for making multilayered ceramic structures from a green tape formulated by using a ceramic powder, a thermoplastic binder resin system, e.g. polyvinylbutyral polymer and dioctyl phthalate plasticizer, dissolved in a volatile solvent mixture comprising both a solvent and a non-solvent for the resin. The preferred solvent mixture is an azeotrope of methanol and toluene.

U.S. Pat. Nos. 4,080,414 (1978) and 4,104,345 (1978) disclose a process for forming ceramic substrates from a green tape formulated by using a ceramic powder such as alumina, the same binder resin system described above dissolved in a volatile solvent mixture in an amount so that the Brookfield viscosity for the resulting slurry composition is about 500 to about 2000 cps. The preferred solvent mixture comprises methanol and methyl isobutyl ketone where the ratio of the evaporation rate of methanol to methyl isobutyl ketone is at least 2.

U.S. Pat. No. 4,234,367 (1980) discloses a method for making multilayered glass-ceramic structures with copper based metallurgy from green tapes using a thermoplastic binder resin system, e.g. polyvinylbutyral polymer and a dioctyl phthalate or dibutyl phthalate plasticizer. A pattern of the copper based conductor is formed on a first green tape and a second green tape is superimposed on the first to sandwich the pattern therebetween. A laminating press is used to laminate the superimposed tapes which is heated in the presence of hydrogen and $H_2O$ to burn-out the binder at lower binder removal temperatures than is ordinarily used with such binder systems. However, the temperatures for burn out are still in the range of 720° to 785° C.

U.S. Pat. No. 4,413,061 (1983) discloses a method for making multilayered glass-ceramic structures from green tapes using a thermoplastic binder resin system, e.g. polyvinylbutyral polymer and a dibutyl phthalate plasticizer. The glass ceramic comprises a mixture of the $\beta$-spodumene type and alphacordierite. The sintering takes place at temperatures in the range of 870° to 1000° C.

U.S. Pat. No. 4,474,731 (1984) discloses a process for making green tapes in which a compact of ceramic powder, a polymeric hydrocarbon binder such as Butvar B-98, which comprises 80 mole % polyvinyl butyral, 18-20 mole % polyvinyl alcohol and up to 2.5 mole % polyvinyl acetate, in which nickel or palladium ions are dissolved in the binder to serve as a catalyst in the firing step at temperatures of 350° to 780° C.

U.S. Pat. No. 4,504,339 (1985) discloses a method for making green tapes using a copper-based conductor, a thermally depolymerizable resin such as poly(alphamethylstyrene), poly(methylmethacrylate) or polytetrafluoroethylene, and firing the resulting green tape under inert atmospheric conditions containing water vapor to overcome the problem of binder removal during firing.

U.S. Pat. No. 4,540,621 (1985) discloses a method for making multilayered glass-ceramic structures from green tapes using crystalline cordierite which has a coefficient of thermal expansion of about $15 \times 10^{-7}$° $C.^{-1}$ at 20° to 100° C. a binder such as Butvar B-98 referred to above. Prior to sintering at temperature of about 1300° to 1450° C., a molybdenum and/or tungsten pattern is deposited on the green tape.

U.S. Pat. No. 4,598 107 (1986) discloses a method for forming a slurry for casting into a ceramic green tape using a thermoplastic organic binder such as polyvinylbutyral, a plasticizer such as dipropylene glycol dibenzoate, an organic solvent, and a ceramic powder consisting of alumina and glass frit. The slurry is formed from a pre-mix of the solvent, plasticizer, and binder having a relatively low viscosity of 2-8 cps, mixing the glass frit into the pre-mix and dispersing the alumina into the mixture to form an intermediate slurry and finally combining the latter with a high viscosity post-mix of solvent and binder having a relatively high viscosity of 3,000-30,000 cps.

U.S Pat. No. 4,627,160 (1986) discloses a method for forming a glass-ceramic composite substrate in which a catalyst of a copper-containing material is incorporated into the slurry to accelerate the oxidation of the binder and to eliminate carbonaceous binder residue. The binder is described as being any suitable one such as polyvinylbutyral resin.

U.S. Pat. No. 4,752,857 (1988) discloses a method for making green tapes using the cellulosic resins as binders, a dielectric component and a solvent to solubilize the binder.

U.S. Pat. No. 4,766,027 (1988) discloses a method for overcoming the problem of binder burn-out by incorporating internal copper conductors into the slurry used to make the green tapes. The green tapes were made, for example, by combining a thick copper paste of butyl methacrylate resin dissolved in terpineol, and copper powder with a ceramic dielectric material, e.g. a nonreducing glass dispersed in an acrylic polymer binder. Upon firing the resulting green tape, most of the organic binder is removed by preheating in nitrogen at 400° C. for about an hour.

"Nitrogen-Nitrous Oxide A Reactive Atmosphere for Copper Thick-Film Processing", E. A. Hayduk Jr..and B. M. Adams, *International Society for Hybrid Manufacturing Proceedings of* 1987 Conference of ISHM, pages 569-576 teaches the use of nitrous oxide reactive gas atmospheres which are effective in burning out binders from copper multilayer green tape circuitry.

Japanese Patent Application SHO 62/21753 (1987) and its European Patent Office counterpart EP-300039-A (1989) discloses using poly(alkylene carbonate), preferably poly(ethylene carbonate) and poly(propylene carbonate), as binders for molding ceramic or metallic powders. Additives such as plasticizers, lubricants, wetting agents. surfactants and other additives and other binders, are disclosed as being used as long as the purpose is not adversely affected.

U.S. Pat. Nos. 4.814,370 (1989) and 4,882,110 (1989) teach the use of $CO_2$ copolymers such as poly(propylene carbonate) as binders for ceramic bodies which are shaped into a suitable green body using conventional procedures, e.g. extrusion molding, injection molding, tape shaping, compression molding, slip casting and the like. Examples are given in which green compacts of alumnia and poly(propylene carbonate) are more effectively sintered in air at 1550° C. for 2 hours than other binders such as polyvinyl alcohol and methylcellulose binders.

U.S. Pat. No. 4,874,030 (1989) discloses compositions useful in decomposition molding procedures such as destructive foam casting or ceramic or metallic powder sintering which comprise blends of polymers having greater than 50 weight percent propylene carbonate units and polymers having greater than 50 weight percent methyl methacrylate units. Preferred blends contain 35 to 65 weight percent poly(methyl methacrylate) and 65 to 35 weight percent poly(propylene carbonate).

U.S. Pat. Nos. 3,585,168 (1971) and 3,953,383 (1976) describe methods for preparing poly(propylene carbonate) by copolymerizing propylene oxide and carbon dioxide. A more detailed description of the preparation of poly(propylene carbonate) resins is given in Inoue, Higashi and Yamazaki, "Synthesis of Macromolecules from Carbon Dioxide", *Organic and Bio-Organic Chemistry of Carbon Dioxide,* Chapter 4, John Wiley & Sons, New York (1982). The description for the preparation of such resins is incorporated herein by reference.

It has been found that conventional prior art procedures are not sufficient to produce satisfactory green tapes using poly(propylene carbonate) as a binder. There is nothing in any of the prior art references which indicates the unexpectedly low temperatures, in either an oxidizing or a non-oxidizing atmosphere, that can be used for firing dry green tapes containing poly(propylene carbonate), ceramic powder and plasticizer in order to remove substantially all of the binder system as determined by thermogravimetric anaylsis (TGA).

SUMMARY OF THE INVENTION

The ceramic tape formulation of this invention comprises 15 to 30 volumes of a ceramic powder, 5 to 15 volumes of poly(propylene carbonate) in which the volume ratio of the ceramic powder to poly(propylene carbonate) is in the range of 1:1 to 6:1; 60 to 75 volumes of a solvent mixture in which the volume ratio of the solvent mixture to poly(propylene carbonate) is in the range of 4:1 to 15:1; and 0.2 to 2 volumes of a plasticizer.

The method of the present invention comprises the steps of admixing the foregoing components to form a slurry having a Brookfield viscosity of 500 to 4500 centipoise at 25° C.; casting a thin film of the slurry onto a substrate; removing the solvent from the slurry; and removing the resulting dry green tape having a tensile strength of greater than 35 psi from the substrate.

The dry green tapes of this invention comprise 45 to 90 volumes of ceramic powder; 10 to 50 volumes of poly(propylene carbonate); and 0.4 to 10 volumes of a plasticizer and have tensile strength ranges and the density ranges as set forth below depending on the specific ceramic used in their preparation:

Alumina: 35 to 350 psi, 1.6 to 2.1 g/cc
Barium titanate: 35 to 800 psi, 2.3 to 2.7 g/cc
Glass-ceramic: 35 to 250 psi. 1.2 to 1.5 g/cc

DETAILED DESCRIPTION OF THE INVENTION

Figure 1:
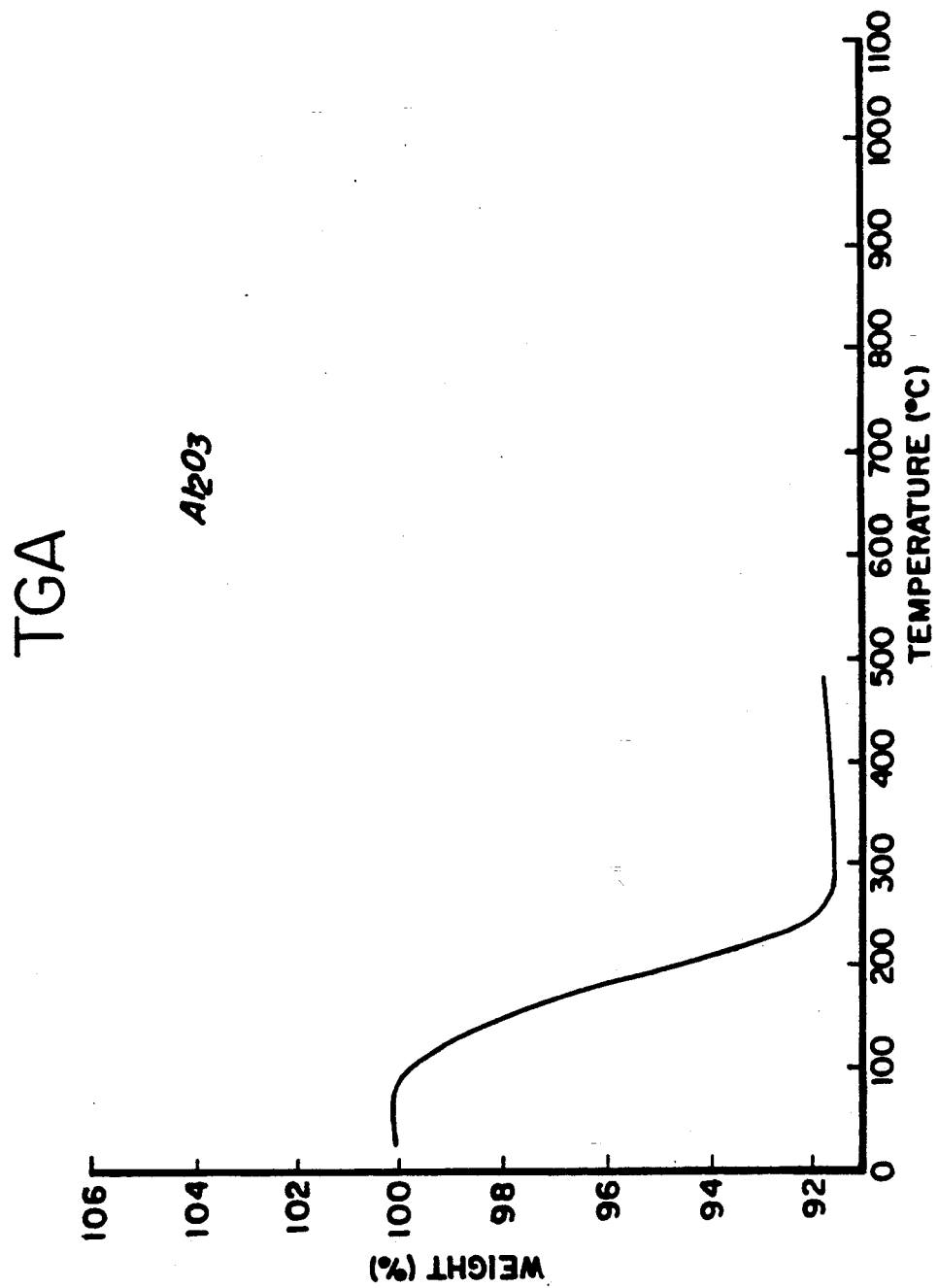
FIG. 1 is a TGA of an alumina ceramic green tape of the present invention using a DuPont Instruments Model 951 Thermogravimetric Analyzer equipped with a Model 1090 Thermal Analyzer. The TGA showed that substantially all of the binder system was removed after the alumina ceramic green tape had been heated to about 275° C.

Poly(propylene carbonate) should have a molecular weight of at least 5,000 to assure mechanical properties and a molecular weight of about 500,000 is a useful upper limit. Above this upper molecular weight limit, the viscosity would be too high for the resulting tape formulation. Preferably, the poly(propylene carbonate) for use as a binder in making green tapes ranges from 50,000 to 200,000, contains at least 70 weight percent propylene carbonate units and has less than 200 ppm metallic residue. Poly(propylene carbonate) can be prepared by the copolymerization of carbon dioxide and propylene oxide as described by the Inoue et al reference cited above.

It is critical that a plasticizer is included in with the poly(propylene carbonate) to form the binder system of the tape formulation of this invention. The plasticizer can be selected from the following: butylbenzyl phthalate, dibutyl phthalate, dipropylene glycol dibenzoate and propylene carbonate.

Ceramic powders employed can be chosen from alumina, silica, titania, zirconia, cordierite, forsterite, titanates, ferrites, steatite, silicon carbide, silicon nitride, and various glass-ceramics such as the $\beta$-spodumene type and alphacordierite and mixtures thereof. Typically, the powders should have average particle sizes in the range of 0.5 to 6 microns and surface areas in the range of 1 to 4 square meters per gram.

The composition of the solvent system is critical to the precursor formulation and preferably ranges 12 to 100 volumes of an organic solvent for poly(propylene carbonate) and 0 to 88 volumes of a diluent having a solubility for poly(propylene carbonate) of no more than 5 volume % at 25° C. A solvent for poly(propylene carbonate) is defined as having a hydrogen bonding solubility parameter of about 2 to 7 and a polar solubility parameter of about 4 to 7. A diluent is a material having solubility parameters outside those of the solvent, but is capable of swelling the polymer. Typical organic solvents which are suitable include methyl ethyl ketone, methylene chloride, chloroform, methyl acetate, acetonitrile, acetone, tetrahydrofuran and benzene. Diluents which are suitable include toluene, xylene, ethanol and methanol. A particularly preferred solvent system comprises 33 volumes of methyl ethyl ketone and 67 volumes of toluene as the diluent.

In addition to the ceramic powder and the binder and solvent systems of the formulation of this invention, surfactants and other dispersants, pigments and other additives known in the industry can be included. Additives such as dispersants tend to alter the viscosity and may cause detrimental loss of tensile strength and alteration of the density of the resultant green tape. Therefore, they should only be added with caution and in amounts not to exceed 5 volume percent of the total formulation.

EXAMPLES

The following examples serve to give specific illustrations of practice of the present invention but are not intended to limit the scope of the invention in any way.

EXAMPLES 1-9

1. Ceramic Slurry Preparation

In each of the examples, various ceramic slurries were prepared by milling into a well-dispersed mixture the following components:

(a) a ceramic powder which was 0.5 to 6 microns in size selected from one of the following three ceramics:
  (1) 300 grams of alumina (obtained from either Coors Ceramic Company, ADS-90 Alumina or Alcoa Corporation, A-12 Alumina) having a density of 3.8 g/cc; or
  (2) 434 grams of barium titanate (TAM Ticon C) having a density of 5.5 g/cc; or
  (3) 211 grams of glass-ceramic (obtained from Ferro Corporation. EG-221) having a density of 2.7 g/cc; and
(b) 20 to 74 grams of poly(propylene carbonate), referred to in Tables 1, 2 and 3 as PPC, (obtained from Air Products and Chemicals, Inc., QPAC® 40M) having a density of 1.3 g/cc as the binder, the specific amount of PPC can be calculated from the volume percentages set forth in Table 1 below for each of the examples;
(c) 1.6 to 6 grams of butylbenzyl phthalate (obtained from Monsanto, Santicizer 160) having a density of 1.1 g/cc as the plasticizer, the specific amounts of which can be calculated from the volume percentages set forth in Table 1 below for each of the examples and which plasticizer was combined with the binder to form the binder system of the formulation; and
(d) 169 to 277 grams of a solvent system comprising methyl ethyl ketone (MEK) or MEK and toluene, the specific amounts of which can be calculated from the volume percentages set forth in Table 1 below.

The ceramic slurries for each of the examples were prepared by first simultaneously adding pre-determined amounts of the foregoing slurry components to a 1 quart Roalox ceramic milling jar containing 700 g of 3/8 inch cylindrical ceramic powder media. Although the components can be added in any order, it is preferred that they be added simultaneously. The contents of the milling jar were rolled at about 80 RPM (ca. 70% critical speed) for 12–48 hours. It was known that significantly above or below this amount of milling media, too little cascading action was achieved which prevents good mixing. If less than a 12-hour milling time was used, a well-dispersed, fluid-like slurry was not achieved. No additional benefit was noted if the milling time exceeded 48-hours. After milling, the slurry was discharged from the jar and degassed by 3 exposures to vacuum (>28 inches of water) for about 2 to 3 minutes in a vacuum dessicator. Between vacuum exposures, the slurry was exposed to the atmosphere and shaken to loosen entrapped air bubbles. These steps were used to obtain the desired dry green tapes which were smoother than tapes obtained without using these processing steps.

The optimum amount of solvent system for preparation of the green tape slurries of this invention was found to be 190 to 340 cc of solvent per 79 cc of ceramic. The lowest value of solvent content corresponds to a green tape where there were only about 15 cc of polymer per 79 cc of ceramic. Likewise, 340 cc of solvent system corresponds to a green tape where there were about 57 cc of polymer per 79 cc of ceramic. These solvent contents gave slurries with viscosities as set forth in Table 1

TABLE 1

Examples of PPC-Based Green Tape Formulations

| Example | 1 | 2 | 3 | 4 | 5 | 6 | 7 | 8 | 9 |
|---|---|---|---|---|---|---|---|---|---|
| Ceramic | 18.4 (A) | 20.2 (A) | 20.5 (B) | 17.8 (B) | 19.0 (C) | 16.7 (C) | 27.0 (A) | 20.0 (B) | 20.9 (B) |
| PPC (E) | 11.8 | 9.9 | 7.5 | 11.4 | 9.7 | 12.0 | 5.3 | 7.3 | 7.6 |
| Plasticizer (F) | 1.0 | 0.8 | 0.7 | 1.1 | 0.8 | 1.1 | 0.4 | 0.7 | 0.7 |
| Solvent System | 68.8 | 69.1 | 71.3 | 69.6 | 70.4 | 70.1 | 67.3 | 72.0 | 70.7 |
| % MEK | 38.7 | 31.5 | 51.8 | 40.8 | 32.6 | 40.7 | 17.0 | 100.0 | 13.7 |
| % Toluene | 61.3 | 68.5 | 48.2 | 59.2 | 67.4 | 59.3 | 83.0 | — | 86.3 |
| Viscosity (cps) (#3, 30 rpm) | 1600 | 1400 | 2200 | 4000 | 2200 | 2100 | 2300 | 1800 | 2700 |
| Yield Strength (psi) | 400 | 185 | 400 | 900 | 280 | 400 | 100 | 350 | no yield |
| Tensile Strength (psi) | 350 | 125 | 370 | 800 | 210 | 250 | 80 | 330 | 350 |
| Tensile Modulus (psi) | 31500 | 13200 | 30000 | 85000 | 20200 | 25700 | 8900 | 30000 | 37000 |
| Flexibility | good | good | good | good | good | good | good | good | good |
| Density (g/cc) | 2.04 | 1.89 | 2.52 | 2.62 | 1.29 | 1.46 | 1.61 | 2.3 | 2.43 |

(A) Alumina. Coors ADS-90, Density: 3.8 g/cc
(B) Barium Titanate. TAM Ticon C, Density: 5.5 g/cc
(C) Glass-Ceramic. Ferro EG-221, Density: 2.7 g/cc
(E) Air Products QPAC 40M, Density: 1.3 g/cc
(F) Butylbenzyl Phthalate, Density: 1.1 g/cc
Formulations are given in volume percentages.
Mechanical data and densities are for dry green tapes.

from 1400 to 4000 cps (Brookfield viscometer, #3 spindle, 30 rpm), which viscosity range is very desirable for green tape formation. At these viscosities, the slurry is fluid enough so that efficient milling occurs. A very viscous slurry would not mill efficiently and thus the slurry would not be well dispersed. The slurry viscosity should be low enough to move easily with the doctor blade knife (giving a smooth surface), but high enough so that the slurry does not run beyond the area laid down by the doctor blade and cause uneven tape thickness. These viscosity parameters can be varied, but slurries with viscosities significantly higher than 4500 cps or significantly lower than 500 cps will not meet the requirements just described.

2. Green Tape Preparation

The resulting green tape formulations were cast in batches, using a movable doctor blade (having a slurry reservoir). Casting was performed on a flat glass plate covered with silicone-coated Mylar ® film to achieve good release of the tape. Doctor blade settings were typically 10-25 mils, giving dried green tapes about 5 to 12 mils thick. Doctor blade speed during casting was about 6 inches/min. in order to make the smoothest tapes. Green tapes were dried in air at room temperature for about 24 hours prior to the lamination step. Sheets other than silicone-coated Mylar film which have low surface energy and an easy release surface may be used for casting.

The dry green tapes of each of the examples were tested for yield and tensile strengths according to ASTM D-638 and tensile modulus according to a procedure similar to ASTM D-638. The mechanical data and densities are listed in Table 1 for each of the examples.

The yield and tensile strengths of the resulting green tapes can be altered from those shown in Table 1 by varying the level of binder. If less polymer is used, a green tape is produced having yield and tensile strengths that are often less than required for certain applications. If more polymer is used, a green tape is produced whose density can be lower than desired for certain applications.

For each green tape formulation that was prepared, the optimum plasticizer content has been found to be about 8 grams of plasticizer per 100 grams of polymer. Significantly below this level (less than 0.4 volumes of plasticizer per 10 volumes of polymer), the green tapes are very strong, but too brittle to be of practical use. Significantly above this level (10 volumes of plasticizer per 50 volumes of polymer), the green tapes exhibited good flexibility, but were too weak (tensile strength of less than 35 psi) to be of practical use. It is noted in Table 1 that all of the green tapes of the examples exhibited good flexibility.

3. Lamination of Green Tapes

Lamination of green tapes was accomplished by stacking between 5 and 20 pieces of the dry green tape weighing about 500 milligrams and applying a pressure between 6 to 15 kPsi at 25° to 120° C. for 10 to 15 minutes. Typically the lamination was performed at 6 kPsi at 94° C. for 10 minutes. Some tape systems required preheating prior to lamination. Lamination gave continuous laminated parts having densities of:

Barium Titanate: about 3.5 g/cc
Alumina: about 2.75 g/cc
Glass-ceramic: about 1.9 g/cc

EXAMPLES 10-11

The same procedures for ceramic slurry preparation and green tape preparation were used to prepare green tapes from the following formulation:

TABLE 2

| Component | Example 10 | Example 11 | Example 12 |
|---|---|---|---|
| Ceramic Powder | $Al_2O_3$ 29.3 | $BaTiO_3$ 20.9 | Glass-Ceramic 25.3 |
| PPC | 6.6 | 7.6 | 6.7 |
| Plasticizer | 2.0 | 0.7 | 0.6 |
| MEK | 32.1 | 9.8 | 30.2 |
| Toluene | 30.0 | 60.9 | 37.2 |

The formulations above are given in volume percentages.

A piece of the resulting dry alumina ceramic green tape of Example 10 weighing about 10 milligrams was placed in the Dupont Instruments 951 Thermogravimetric Analyzer and the tape was heated in an atmosphere of nitrogen at a temperature rise of 5° C. per min. from room temperature until a temperature of about 500° C. was reached. The weight of the tape as a percentage of the initial weight during this temperature rise was read from the strip chart of the DuPont Model 1090 Thermal Analyzer. The decomposition profile showing the percent of the sample remaining at various temperatures is displayed in FIG. 1. FIG. 1 shows that substantially all of the binder system had been removed after the $Al_2O_3$ ceramic green tape had been heated to about 275° C.

Figure 2:
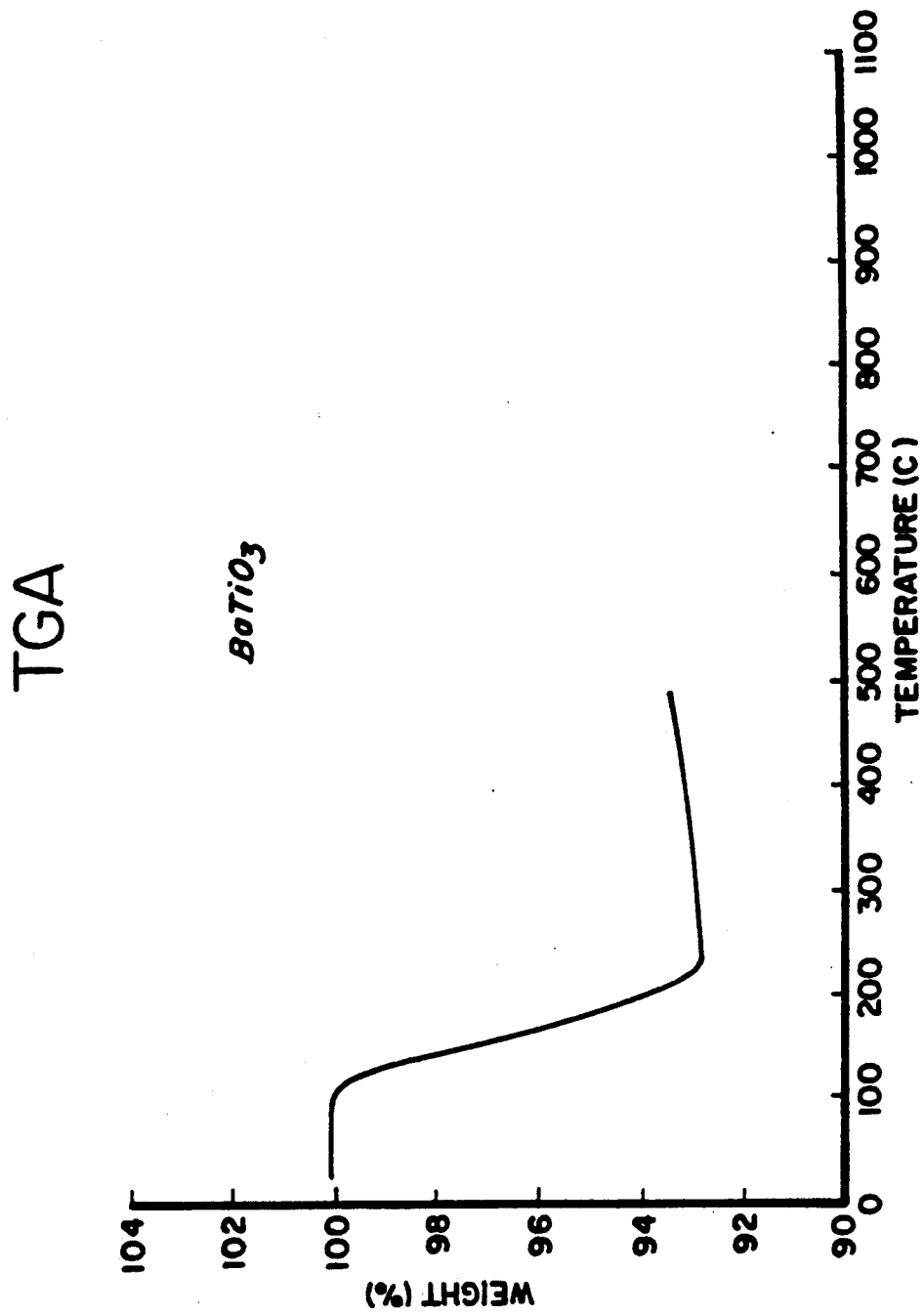
FIG. 2 is a TGA of a barium titanate ceramic green tape of the present invention using the same instrument as described above. The TGA showed that substantially all of the binder system was removed after the barium titanate ceramic green tape had been heated to about 250° C.

The dry barium titanate ceramic green tape of Example 11 was placed in the same TGA equipment running at the same conditions as that of Example 10. FIG. 2 shows that substantially all of the binder system had been removed after the $BaTiO_3$ ceramic green tape had been heated to about 250° C.

Figure 3:
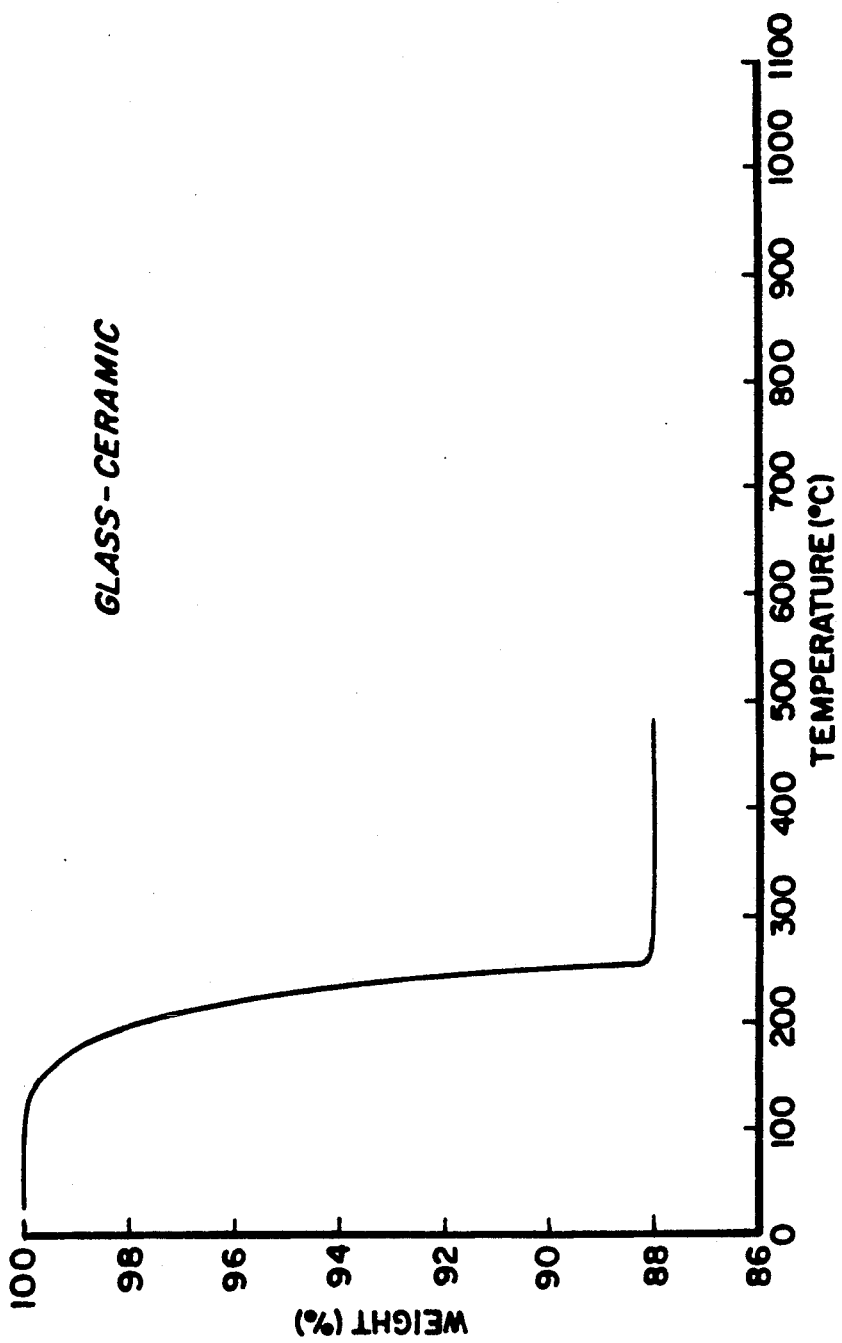
FIG. 3 is a TGA of a glass-ceramic green tape of the present invention using the same instrument as described above. The TGA showed that substantially all of the binder system was removed after the green tape had been heated to about 250° C.

Finally, the dry glass-ceramic green tape of Example 12 was placed in the same TGA equipment running at the same conditions as that of Example 10. FIG. 3 shows that substantially all of the binder system had been removed after the glass-ceramic green tape had been heated to about 250° C.

A dry powder of the binder system comprising the PPC and butylbenzyl phthalate was placed in the same TGA equipment as the green tape of Examples 10–12. It was found that substantially all of the binder system had been removed after it had been fired to about 300° C. This indicates that the combination of the ceramic powder and the binder system has a synergistic effect in unexpectedly lowering the firing temperature at least 25° C.

CONTROLS

The controls serve to illustrate the poor quality of green tapes that was obtained when the amounts of the components used in the poly(propylene carbonate)-based green tape formulations were not within the broad limits specified by the present invention.

Control 1

The same procedures for ceramic slurry preparation and green tape preparation were used for this control that were used in the examples except that no plasticizer was added to the binder system. As shown in Table 2, the resulting dry green tape was too brittle to be of practical use in subsequent processing into ceramic structures.

Control 2

The same procedures were used for this control as were used in the examples except that the amount of plasticizer exceeded the upper limit borderline for plasticizer amounts used in the formulations of this invention as set forth above. As shown in Table 2, the resulting dry green tape had a tensile strength and a tensile modulus which were too low to be of practical use in green tape processing.

Control 3

The same procedures were used for this control as were used in the examples except that the amount of the solvent system was on the upper limit borderline for achieving a Brookfield viscosity of at least 500 cps for the formulations of this invention and which is necessary to successfully cast them into green tapes. As shown in Table 2, the formulation of Control 3 had a viscosity of only 200 cps. Although this control has shown that 75 volume percent solvent mixture was too high for this particular formulation, it is apparent to one skilled in the art that this upper level of solvent mixture can be used depending on the particular poly(propylene carbonate)-based formulation that is followed so long as the lower limit of 500 cps viscosity is obtained.

Control 4

The same procedures were used for this control as were used in the examples except that the amount of solvent system was on the lower limit borderline for achieving a Brookfield viscosity of no higher than about 4500 cps for the formulations of this invention and which is necessary to successfully cast them into smooth surfaced green tapes. As shown in Table 2, the formulation of Control 4 had a viscosity of about 5000 cps. Again it is apparent to one skilled in the art that this lower level of solvent mixture can be used depending on the particular poly(propylene carbonate)-based formulation that is followed so long as the upper limit of 4500 cps viscosity is obtained.

Control 5

The same procedures were used for this control as were used in the examples except that the ratio of organic solvent for the poly(propylene carbonate) to diluent was on the lower limit borderline to completely dissolve the polymeric binder. This resulted in a ceramic slurry which was too grainy and not smooth to allow the preparation of a desirable green tape.

Various other embodiments and aspects of the present invention will occur to one skilled in the art without departing from the spirit and scope of the invention.

TABLE 3

| | Controls of PPC-Based Green Tape Formulations | | | | |
|---|---|---|---|---|---|
| Control | 1 | 2 | 3 | 4 | 5 |
| Ceramic | 21.0 | 20.4 | 17.8 | 33.1 | 28.7 |
| | (B) | (B) | (B) | (D) | (D) |
| PPC (E) | 7.6 | 7.3 | 6.5 | 7.2 | 7.5 |
| Plasticizer (F) | 0 | 2.2 | 0.7 | 0.7 | 0.8 |
| Solvent System | 71.3 | 69.9 | 75.0 | 58.9 | 63.1 |
| % MEK | 26.3 | 26.4 | 11.7 | 51.7 | 10.7 |
| % Toluene | 73.7 | 73.6 | 88.3 | 48.3 | 89.3 |
| Viscosity (cps) (#3, 30 rpm) | 2500 | 2400 | 200 | ca. 5000 | PPC did not completely dissolve |
| Yield Strength (psi) | no yield | 35 | 290 | — | — |
| Tensile Strength (psi) | 290 | 22 | 205 | — | — |
| Tensile Modulus (psi) | 48000 | 1600 | 35000 | — | — |
| Flexibility | very brittle | good | good | — | — |
| Density (g/cc) | 2.43 | 2.50 | 2.64 | — | — |

(B) Barium Titanate. TAM Ticon C, Density: 5.5 g/cc
(D) Alumina. Alcoa A-12, Density: 3.8 g/cc
(E) Air Products QPAC 40M, Density: 1.3 g/cc
(F) Butylbenzyl Phthalate, Density: 1.1 g/cc
Formulations are given in volume percentages.
Mechanical data and densities are for dry green tapes.

I claim:

1. A method for producing a ceramic green tape which comprises:

(a) admixing amounts consisting essentially of 15 to 30 volumes of ceramic powder, 5 to 15 volumes of poly(propylene carbonate); 60 to 75 volumes of a solvent mixture, and 0.2 to 2 volumes of a plasticizer to form a slurry having a Brookfield viscosity in the range of 500 to 4500 cps at 25° C.;

(b) casting a thin film of said slurry onto a substrate;

(c) removing the solvent from said slurry; and (d) removing the resulting green tape having a tensile strength of greater than 35 psi from said substrate; and then firing the resulting ceramic green tape at temperatures in the range of 200° to 400° C. to substantially remove all of the poly(propylene carbonate) and the plasticizer.

2. The method of claim 1 wherein said ceramic powder is selected from the group consisting of alumina, silica, titania, zirconia, cordierite, forsterite, titantes, ferrites, steatite, silicon carbide, silicon nitride, glass-ceramics, and mixtures thereof.

3. The method of claim 2 wherein said glass-ceramics are selected from the group consisting of β-spodumene type, alphacordierite type, and mixtures thereof.

4. The method of claim 2 wherein said titanates is barium titanate.

5. The method of claim 1 wherein said poly(propylene carbonate) has a molecular weight in the range of 50,000 to 200,000, contains at least 70 weight percent propylene carbonate units and has less than 200 ppm metallic residue.

6. The method of claim 1 wherein said solvent mixture comprises 12 to 100 volumes of an organic solvent for poly(propylene) carbonate and 0 to 88 volumes of a diluent having a solubility for poly(propylene carbonate) of no more than 5 volume % at 25° C.

7. The method of claim 6 wherein said organic solvent is methyl ethyl ketone.

8. The method of claim 7 wherein said diluent is toluene.

9. The method of claim 8 wherein said volume ratio of methyl ethyl ketone to toluene is about 1 to 2.

10. The method of claim 1 wherein said plasticizer is butylbenzyl phthalate.

11. The method of claim 1 which further comprises laminating together a plurality of said ceramic green tapes prior to firing.

* * * * *

UNITED STATES PATENT AND TRADEMARK OFFICE
CERTIFICATE OF CORRECTION

PATENT NO. : 5,089,070
DATED : February 18, 1992
INVENTOR(S) : Thomas P. McAndrew It is certified that error appears in the above-identified patent and that said Letters Patent is hereby corrected as shown below:

On the Title page, please add item

[73]   Assignee:   PAC Polymers, Inc.
                             Allentown, PA 18195-1501

Arco Chemical Company
                             Newtown Square, PA 19073

Mitsui Petrochemical Industries, Ltd.
                             Tokyo 100, Japan Signed and Sealed this Eighth Day of June, 1993

Attest:

MICHAEL K. KIRK

Attesting Officer        Acting Commissioner of Patents and Trademarks